(12) United States Patent
Stoodley

(10) Patent No.: US 9,152,535 B2
(45) Date of Patent: Oct. 6, 2015

(54) PROGRAMMATIC IDENTIFICATION OF ROOT METHOD

(71) Applicant: International Business Machines Corporation, Armonk, NY (US)

(72) Inventor: Mark G. Stoodley, Markham (CA)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 13/667,599

(22) Filed: Nov. 2, 2012

(65) Prior Publication Data

US 2013/0111481 A1 May 2, 2013

(30) Foreign Application Priority Data

Nov. 2, 2011 (CA) ..................................... 2756839

(51) Int. Cl.
- *G06F 9/44* (2006.01)
- *G06F 11/36* (2006.01)
- *G06F 11/34* (2006.01)

(52) U.S. Cl.
CPC .......... *G06F 11/362* (2013.01); *G06F 11/3466* (2013.01); *G06F 11/3636* (2013.01); *G06F 11/3476* (2013.01); *G06F 11/3612* (2013.01)

(58) Field of Classification Search
None
See application file for complete search history.

(56) References Cited

U.S. PATENT DOCUMENTS

| | | | |
|---|---|---|---|
| 6,349,406 B1 * | 2/2002 | Levine et al. .................. | 717/128 |
| 6,539,339 B1 * | 3/2003 | Berry et al. .................... | 702/186 |
| 6,651,243 B1 * | 11/2003 | Berry et al. .................... | 717/130 |
| 6,658,652 B1 * | 12/2003 | Alexander et al. ............ | 717/128 |
| 6,662,358 B1 * | 12/2003 | Berry et al. .................... | 717/128 |
| 6,857,120 B1 * | 2/2005 | Arnold et al. .................. | 717/157 |
| 7,293,259 B1 * | 11/2007 | Dmitriev ........................ | 717/130 |
| 7,293,260 B1 | 11/2007 | Dmitriev | |
| 7,293,265 B2 * | 11/2007 | Haghighat et al. ............ | 717/157 |
| 7,325,022 B2 | 1/2008 | Tang et al. | |
| 7,389,497 B1 * | 6/2008 | Edmark et al. ................ | 717/130 |
| 7,401,324 B1 * | 7/2008 | Dmitriev ........................ | 717/130 |
| 8,176,480 B1 * | 5/2012 | Spertus ......................... | 717/158 |

(Continued)

OTHER PUBLICATIONS

Mikhail Dmitriev; Sun Microsystems Laboratories; "Profiling Java Applications Using Code Hotswapping and Dynamic Call Graph Revelation" Jan. 16, 2004; (dmitreiv_2004.pdf; pp. 1-12).*

(Continued)

*Primary Examiner* — Emerson Puente
*Assistant Examiner* — Hiren Patel
(74) *Attorney, Agent, or Firm* — Cantor Colburn LLP; Jeanine Ray-Yarletts

(57) ABSTRACT

Embodiments relate to a computer implemented process, system and program product for identification of a root method for a thread. In one aspect of the embodiment the process includes instrumenting code to form instrumented code and creating stack sample data. It also includes creating method stack sample data in a case that the stack sample data exceeds a stack sample data threshold. It also includes, determining whether a root method is identified, the determining based on using the method stack sample data; and reporting any root method identified for a respective thread.

15 Claims, 4 Drawing Sheets

(56) References Cited

U.S. PATENT DOCUMENTS

| | | | |
|---|---|---|---|
| 2005/0155022 A1* | 7/2005 | DeWitt et al. | 717/131 |
| 2006/0020918 A1* | 1/2006 | Mosberger | 717/124 |
| 2006/0218543 A1* | 9/2006 | Boger | 717/157 |
| 2007/0288908 A1* | 12/2007 | Cain et al. | 717/130 |
| 2008/0307441 A1* | 12/2008 | Kuiper et al. | 719/321 |
| 2009/0241095 A1* | 9/2009 | Jones et al. | 717/128 |
| 2010/0095278 A1 | 4/2010 | Nageshappa et al. | |
| 2010/0107144 A1* | 4/2010 | Alkins et al. | 717/128 |
| 2010/0131803 A1 | 5/2010 | Lamie et al. | |
| 2010/0198799 A1 | 8/2010 | Krishnan et al. | |
| 2011/0138365 A1* | 6/2011 | Schmelter et al. | 717/130 |
| 2011/0283266 A1* | 11/2011 | Gallagher et al. | 717/130 |
| 2012/0054472 A1* | 3/2012 | Altman et al. | 712/219 |
| 2012/0054721 A1* | 3/2012 | Dadiomov et al. | 717/128 |
| 2012/0102474 A1* | 4/2012 | Artzi et al. | 717/157 |
| 2012/0144491 A1* | 6/2012 | Pistoia et al. | 726/25 |
| 2012/0304172 A1* | 11/2012 | Greifeneder et al. | 718/1 |
| 2012/0324194 A1* | 12/2012 | Jacobs et al. | 711/170 |

OTHER PUBLICATIONS

Arnold et al.; IBM T.J. Watson Research Center; "Collecting and Exploiting High-Accuracy Call Graph Profiles in virtual machines"; IEEE 2005 (Arnold_2005.pdf; pp. 1-12).*

Zhuang et al.; "Accurate, Efficient, and Adaptive Calling Context Profiling"; Jun. 16, 2006; (zhuang_2006.pdf; pp. 1-9).*

Zhuang et al.; IBM T.J. Watson Research; "PerfDiff: A Framework for Performance Difference Analysis in a Virtual Machine Environment", Copyright 2008; (zhuang_2008.pdf; pp. 1-10).*

Bergin, John and Murphy, Liam, "Reducing Runtime Complexity of Long-Running Application Services via Dynamic Profiling and Dynamic Bytecode Adaptation for Improved Quality of Service", ASE Workshop on Automating Service Quality, Nov. 2007, Atlanta, GA, pp. 22-27.

Halfond, William G-J., "Web Application Modeling for Testing and Analysis", FSE-16 Doctoral Symp., Nov. 10, 2008 Atlanta GA, pp. 13-16.

* cited by examiner

Identification system
200

PROGRAMMATIC IDENTIFICATION OF ROOT METHOD

PRIORITY

The present application claims priority to Canadian application number (CA) 2756839 filed Nov. 2, 2011, and all the benefits accruing therefrom under 35 U.S.C. §119, the contents of which is incorporated by reference herein in its entirety.

BACKGROUND

This disclosure relates generally to program runtime in a data processing system and more specifically to identification of a root method associated with a thread in a data processing system.

Some types of programs drive the bulk of their respective execution tasks from a single root method or a small set of root methods, even perhaps different root methods on different threads. For example, a transaction processing application typically has a method in which incoming work is detected, examined, and dispatched accordingly to an appropriate handler. This type of root method can potentially optimize resources by providing better profiling but is difficult to find.

In order to find root methods, some techniques are being provided but none of them techniques work very well for identification purposes. One reason may be that root methods are not invoked too often and thus rarely reach the threshold required (or only reach that threshold after a relatively long time) to trigger identification. The other problem is that because root methods frequently do not consume significant processor resources (although tasks called from the root method do), they rarely accumulate very many samples to allow identification.

Speculation and guesses are utilized but they do not always provide correct predictions mainly because design patterns evolve and change over time. In addition, root methods can change over time requiring updates to an application to remain synchronized. Consequently, not all applications follow established design patterns and programmers may not know which method is the root method. In addition, the methodology often only works in applications modified to communicate root methods.

BRIEF SUMMARY

A computer implemented process, system and program product for identification of a root method for a thread is provided. In one embodiment, the process comprises instrumenting code to form instrumented code and creating stack sample data. It also includes creating method stack sample data in a case that the stack sample data exceeds a stack sample data threshold. It also includes determining whether a root method is identified, the determining based on using the method stack sample data and reporting any root method identified for a respective thread.

Additional features and advantages are realized through the techniques of the present disclosure. Other embodiments and aspects of the disclosure are described in detail herein. For a better understanding of the disclosure with the advantages and the features, refer to the description and to the drawings.

DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
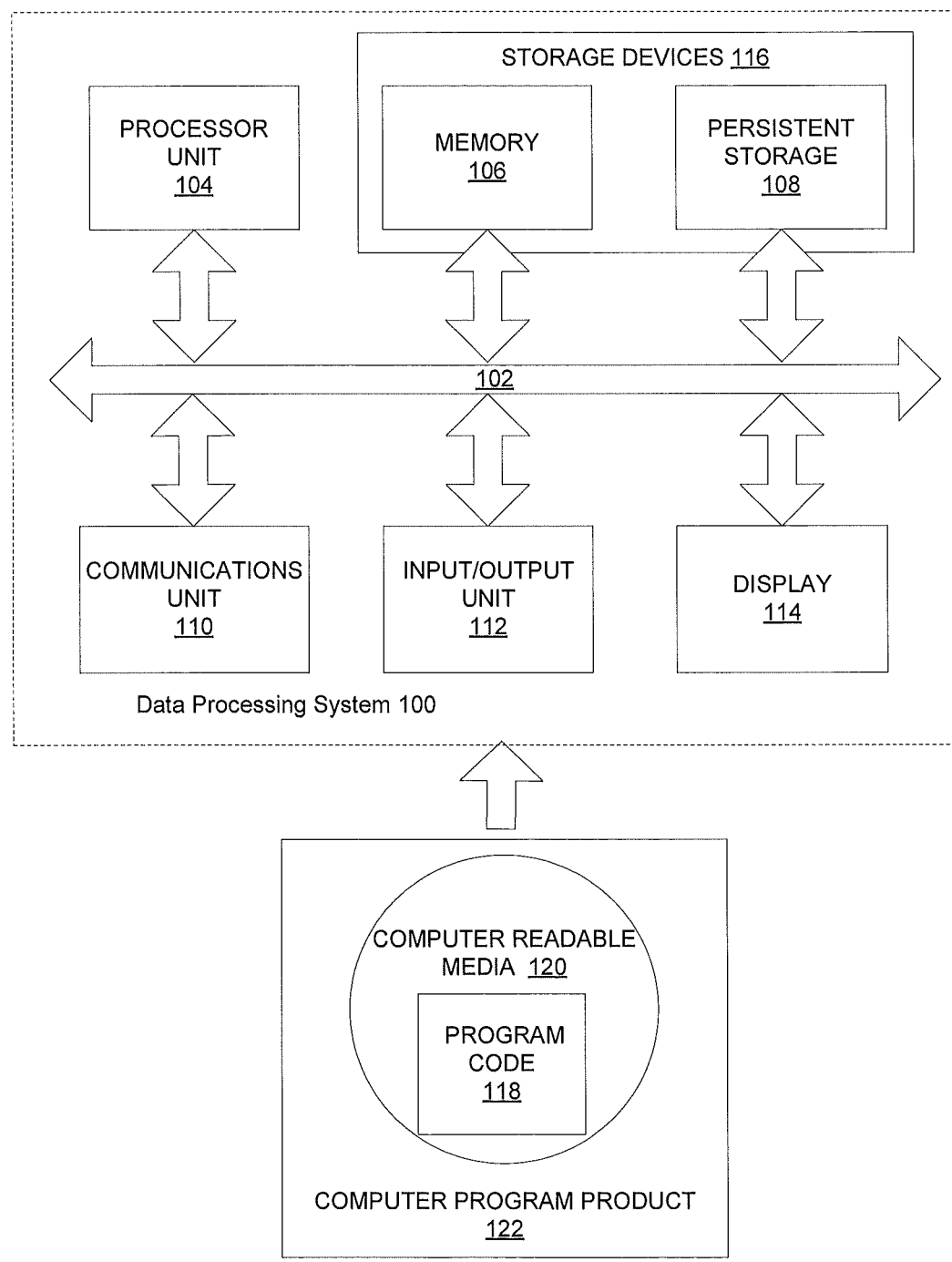
FIG. 1 illustrates a block diagram showing an exemplary data processing system operable for various embodiments of the disclosure.

FIG. 1 is an illustration of a block diagram showing an exemplary data processing system operable for various embodiments of the disclosure as will be presently discussed. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices such as a hard drive, a flash memory, a rewritable optical disk, a rewritable magnetic tape, or some combination of the above. The media used by persistent storage 108 also may be removable and in one embodiment be comprising of a removable hard drive.

Communications unit 110, in one embodiment provides for communications with other data processing systems or devices and/or be a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples, the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 via a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications fabric 102 and may be in turn comprised of one or more buses, such as a system bus or an input/output bus. In one embodiment, the bus system may be implemented using any suitable type of architecture that provides for a transfer of data between different components or devices attached to the bus system. Additionally, a communications unit may include one or more devices used to transmit and receive data, such as a modem or a network adapter. Further, in one embodiment a memory may be memory 106 or a cache such as found in an interface and memory controller hub that may be present in communications fabric 102.

A technique called stack watermarking is employed primarily to determine a working stack size in order to avoid overflows. Handling stack overflows is a critical requirement for many servers especially when there is very little memory available on the embedded devices and hence very little available stack space. This technique relies on obtaining stack samples and to use samples stack pointers on context switches.

According to an illustrative embodiment, a computer-implemented process for identification of a root method is provided. The computer-implemented process comprises instrumenting code to form instrumented code and creating stack sample data. It also comprise creating method stack sample data in a case that the stack sample data exceeds a stack sample data threshold, determining whether a root method is identified using the method stack sample data; and reporting any root method identified for a respective thread. Thread sample data is created in a case that thread samples are provided. It is also provided in a case that thread samples are not provided and in a case that said thread samples exceed a thread sample threshold. In addition, the time period is extended until the stack sample data exceeds the stack sample data threshold.

Using data processing system 100 of FIG. 1 as an example, an illustrative embodiment provides for a computer-implemented process stored in memory 106 is provided and run by processor unit 104 using an enhanced compiler to form instrumented code. In this process if thread sampling exists, then the instrumented code is executed in an enhanced runtime environment to create thread sample data that is stored in storage devices 116. If a thread sample threshold is exceeded, processor unit 104 samples the execution of the instrumented code to create stack sample data, stored in storage devices 116. In addition, if the stack sample threshold is exceeded, processor unit 104 samples the execution of the instrumented code to create method stack sample data, stored in storage devices 116. Processor unit 104 determines whether a root method is identified and if so then the processor unit 104 reports the identified root method for a respective thread. Reporting may be performed using storage devices 116, communicated through communications fabric 102 and further through communications unit 110, input/output unit 112 or display 114.

In an alternative embodiment, program code 118 containing the computer-implemented process may be stored within computer readable media 120 as computer program product 122. In another embodiment, the process for identification of a root method may be implemented using an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus runs the computer program code to direct the apparatus to perform the process of identification of a root method.

Figure 2:
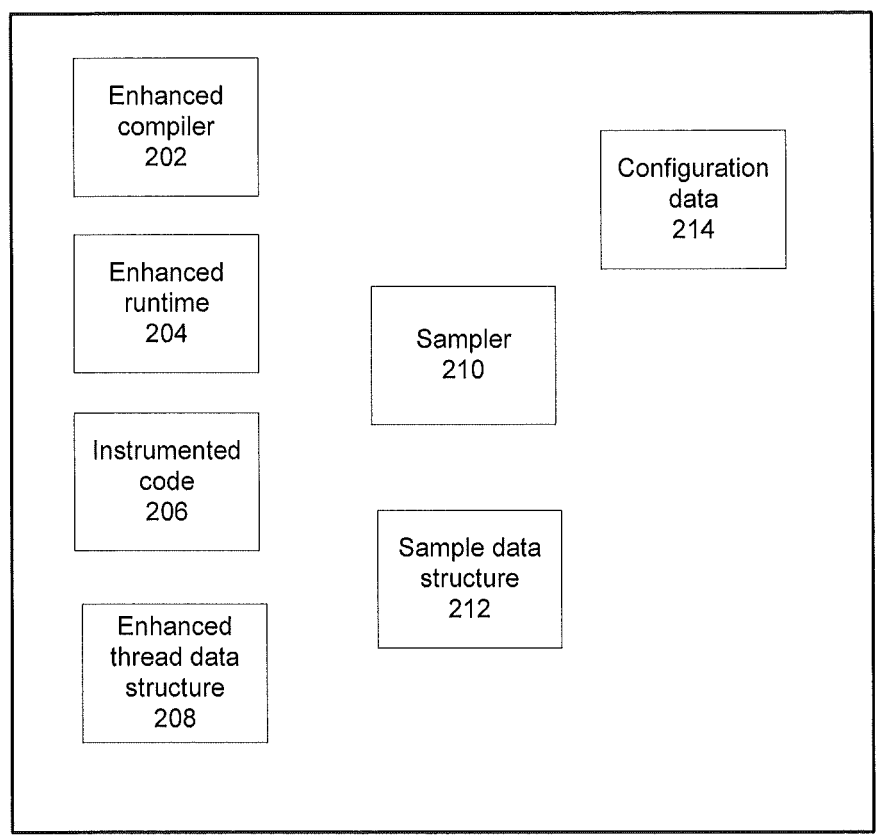
FIG. 2 illustrates a block diagram showing an identification system, in accordance with various embodiments of the disclosure.

FIG. 2 is an illustration of a block diagram for an identification system, in accordance with one or more embodiments of the present disclosure. For example, in one embodiment the identification system 200 can provide a capability to programmatically discover root methods being executed on each thread in a program of interest.

Using this first embodiment, identification system 200 enables identification of a root method on an application thread. Possible uses for embodiments of identification system 200 range from compiler optimizations to garbage collection algorithmic enhancements to tooling enhancements. However these uses are not the subject of this disclosure.

Identification system 200 leverages support of a data processing system, for example data processing system 100 of FIG. 1, to provide typical system services and user interface support. A number of components form identification system 200 including enhanced compiler 202, enhanced runtime 204, instrumented code 206, enhanced thread data structure 208, sampler 210, sample data structure 212 and optionally configuration data 214. Sampler 210, and sample data structure 212 may alternatively be provided by an already available tool or system service in a supporting data processing system, such as data processing system 100 of FIG. 1. Configuration data 214 is optional because control of the sampling operation including duration of sample period and sample size may be managed by an existing sample service or using default values which do not require customization in typical use. For example, sample control can be provided directly in the inserted code portions by enhanced compiler 202 to direct enhanced runtime 204.

Addition of low overhead instrumentation by enhanced compiler 202 to methods of a program of interest forms instrumented code 206. Execution of instrumented code 206 by an aware enhanced runtime 204 enables tracking of values including elements comprising the highest (assuming a stack grows downward) stack pointer value per thread and sampling the high stack marks periodically, using a sampling-based system such as sampler 210 saving sampled information in to sample data structure 212, to determine precisely what root methods exist in the program of interest.

Through programmatic adjustment of a length (duration of time or count of cycles or observations (samples)) of a sampling period, which may be provided in an optional configuration data 214 further including a different value for a sample size associated with each instrumented method or one size for all instrumented methods, root methods that repeatedly execute tasks with any duration (for example, transaction time) can be found. A suitable target environment for embodiments of the disclosed programmatic capability includes a Java virtual machine or other managed runtime environment. Nevertheless, with appropriate runtime support (for example, an online sampling framework) implementations in more traditional language environments may be possible.

Identification system 200 enables per thread stack pointer tracking, using periodic stack samples, and periodic method stack samples. To enable per-thread stack pointer tracking, enhanced compiler 202 adds a pair of values to form enhanced thread data structure 208, forming instrumented code 206, that is adjusted by each executing method in an aware enhanced runtime 204, in the form of a highest stack value (thread→HSV), and a return address corresponding to highest stack value (thread→RA_HSV). Other elements of enhanced thread data structure 208 to maintain and track data used in identification system 200 include element values comprising sample highest stack pointer value (thread→S_HSV), sample return address corresponding to sample highest stack pointer value (thread→S_RA_HSV), a number of times the sample highest stack pointer value has been seen (thread→S_COUNT_HSV), stack sample period (thread→SSP), a current application thread sample count since a last stack sample (thread→ATSAMPLE_COUNT) and a current stack sample count since the last method sample (thread→METHOD_SAMPLE_COUNT) are described in further portions of the disclosure.

Figure 3:
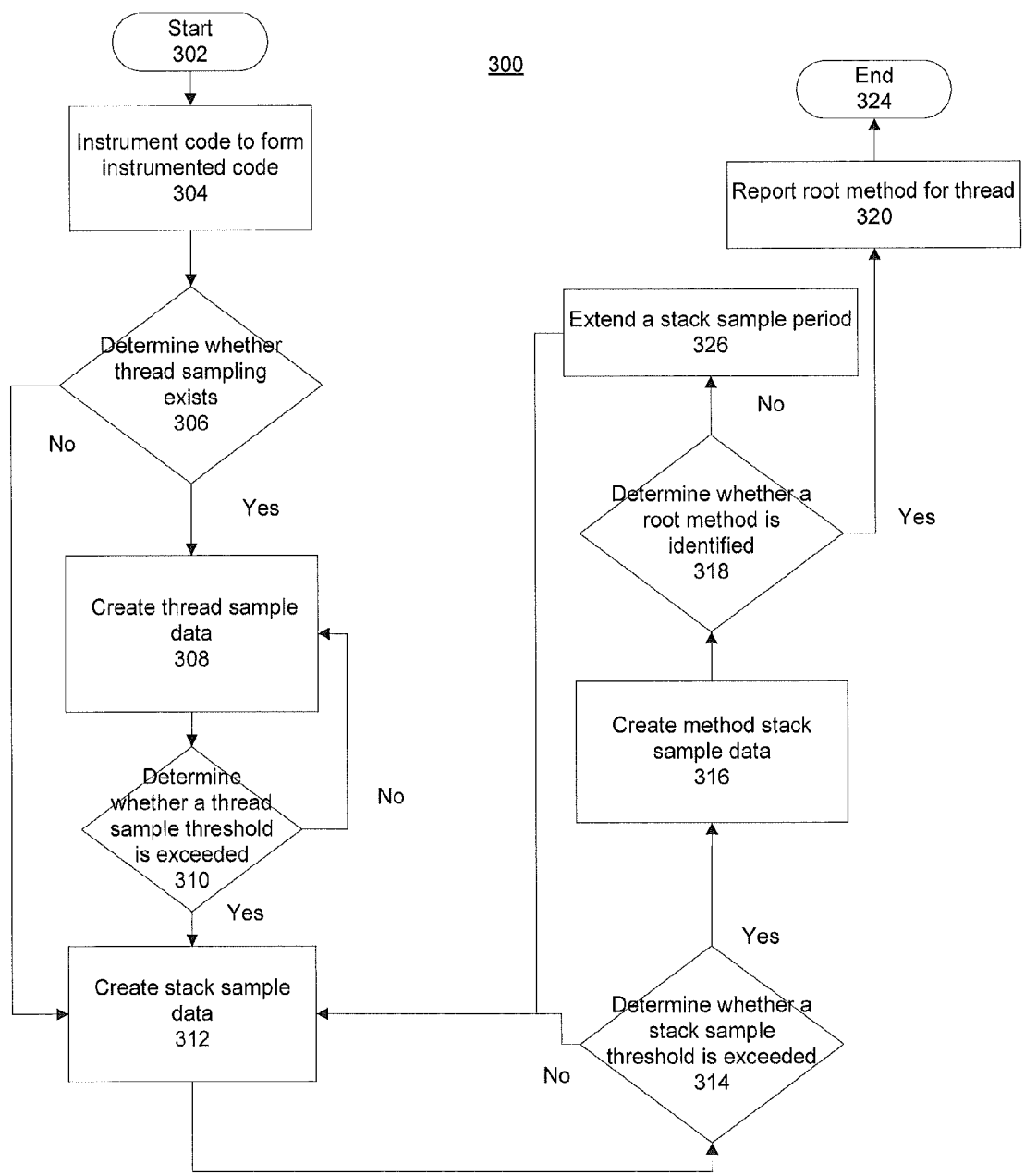
FIG. 3 is a flowchart illustration of an identification process using the identification system of the embodiment(s) in FIG. 2 in accordance with one embodiment of the disclosure.

With reference to FIG. 3, a flowchart of an identification process, in accordance with one embodiment of the disclosure is presented. Process 300 is an example of a root method identification process using an embodiment of identification system 200 of FIG. 2.

Process 300 begins (step 302) and instruments code to form instrumented code (step 304). Code instrumentation is performed by an enhanced compiler, such as enhanced compiler 202 of FIG. 2, through addition of values used in tracking values associated with stack activity to form an enhanced thread data structure. A pair of values is added to the thread structure that will be adjusted by each executing method, representing a highest stack value (thread→HSV), and a return address corresponding to highest stack value (thread→RA_HSV). For example, in compiled code for each method, the following instrumentation pseudo-code is added, using SP to represent a current stack pointer when the method executes:

```
if (SP > thread->HSV) {
   thread->HSV = SP;
   thread->RA_HSV = *(int**)(SP+<offset_to_return_address>);
}
```

SP is preferred to be a value in the stack frame of the caller, therefore the size of the return address and the arguments for the method are typically added to SP before storing the value as in:

```
tempSP = SP+sizeof(return address)+sizeof(method arguments); // amount
to add is a compile-time constant for the method being compiled
if (tempSP > thread->HSV) {
  thread->HSV = tempSP;
  thread->RA_HSV = *(int**)(SP+<offset_to_return_address>);
}
```

The instrumentation code is typically more efficiently written when inserted either just before a method buys a respective stack frame, or just after the method releases a respective stack frame, because in that case SP is likely pointing at the address of the return value on the stack. When the instrumentation code is inserted in another location in the code of interest, a size of the stack frame of the current method must also be added into tempSP before the instrumentation is executed. On some platforms, a return address does not appear directly on the stack but can be found in a register, in which case this value stored in the register should be obtained and stored into thread→RA_HSV.

In an embodiment, a preferred location to insert the code instrumentation is in a method epilog code between a time that a stack frame of the method is discarded but before the return instruction has executed. For improved branch misprediction behavior, code may be arranged as:

```
tempSP = SP+sizeof(return address)+sizeof(method arguments);
if (tempSP > thread->HSV) goto updateThreadStackPointer
return;
L:updateThreadStackPointer:
thread->HSV = tempSP;
thread->RA_HSV = *(int**)(SP);// in return path so SP points
                              // right at return address
return;
```

Rather than returning directly after updating the thread stack pointer tracking information, the instrumented code could also branch back up to the single return statement. The example code may typically be inserted into any compiled method to accomplish stack pointer tracking, however there are typically practical complications in implementing stack pointer tracking in production data processing systems.

A first complication arises because some systems do not rely solely on compiled code. In systems where not all code is compiled, there may be interpreted code using a different stack (for example, a Java operand stack) than a native stack used by compiled code. Since the native stack and the interpreted code stack are two separate memory areas, simply comparing stack pointers is not sufficient to determine whether an interpreted frame is higher on the stack compared to a native frame, or vice versa. One way to accommodate the presence of two stacks is to track HSV values for both the interpreted and native stacks independently.

In one example, when an interpreted frame returns to another (a caller's) interpreted frame only the interpreter SP value need be compared to the interpreter HSV to determine whether the SP value of the caller should replace the interpreter HSV. In another example, when a native code frame returns to another (the caller's) native code frame only the native SP value needs to be compared to the native code HSV to determine whether the SP value of the caller should replace the native code HSV.

In another example, when an interpreted frame returns to a native code frame, when the SP value of the caller is larger than the native code HSV, then replace the native code HSV and also, when the SP value of the callee is equal to the interpreter HSV, noting (on the thread) that the native code HSV is larger than the interpreter HSV. In another example of a native code frame returning to an interpreted frame, when the SP value of the caller is larger than the interpreter HSV, then replace the interpreter HSV and also, when the SP value of the callee is equal to the native code HSV, noting (on the thread) that the interpreter HSV is larger than the native code HSV. The new conditions checked in the just described two examples require a new Boolean value added to the thread and tracked in the form of (thread→INTERPRETER_HSV_HIGHEST) which indicates whether the interpreter HSV is currently higher than the native HSV. The described technique may thus be extended to systems employing more than two different types of frames accessing more than two different stacks.

In a second complication, native compiled code frames cannot be compiled with the instrumented code described previously. For example, some methods may be provided as part of a third party shared library that cannot be recompiled. Possible approaches may include using binary instrumentation to add the instrumented code required, although this approach may not be practical in many scenarios, or accepting the methods cannot be properly tracked.

A third complication rises when returning normally from a method M is not the only way for control to transfer from M to a method higher on the stack wherein exceptions can also be thrown from M that could be caught by a frame higher than M (possibly many frames higher on the stack). Properly capturing exceptional control transfer is handled most easily by adding code to the runtime service that walks frames on the stack to determine where a thrown exception should be handled. By inserting the same instrumentation code as previously described into an iterator that pops frames off the stack to find the proper exception handler, the transitions can be captured. The code portion to compute tempSP in the code snippet of the previous example can be modified to instead compute an appropriate stack pointer for a handler entry point.

Another complication may occur when a stack of a thread is increased or has grown. For example, in Java virtual machines implementations, every method prolog may test current bounds of the allocated stack to determine whether the frame of the respective method will overflow a current stack size. When an overflow condition is detected, a larger stack is allocated and the current stack is copied into the larger space, at which point method execution is allowed to continue. When this overflow recovery process occurs, the HSV stack pointer value stored on the thread must be updated by adding a value of (new thread stack base−old thread stack base), just like any other stack address stored in the current thread or respective stack. For example, when the old stack is based at 0x100 and the new stack is based at 0x1000, then as part of a stack growth operation, the following statement is executed: thread→HSV+=(0x1000−0x100);

Instrumenting code to form instrumented code accordingly further comprises adding code using a technique selected from a set of techniques including in a presence of more than one stack, tracking HSV values for each stack independently, wherein the more than one stack is a set of stacks including an interpreted stack and a native stack. Furthermore, it also includes using binary instrumentation, adding code to the enhanced runtime that walks frames on a stack to determine where a thrown exception should be handled; and updating an HSV stack pointer value stored on a thread by adding a value of (new thread stack base−old thread stack base). A selected technique may therefore be identified to suit a current implementation.

Process 300 determines whether thread sampling exists (step 306). Responsive to a determination that thread sampling does not exist, process 300 jumps ahead to step 312. Responsive to a determination that thread sampling exists process 300 samples executing code in an enhanced runtime to create thread sample data (step 308). The assumption is the application is being sampled periodically to identify methods consuming significant processor resources. In the example the disclosed identification process leverages an existing sampling framework, however where an existing sampling framework does not exist a sampling capability would be required.

Process 300 determines whether a thread sample threshold is exceeded (step 310). For example, an existing sampling framework fires samples on application threads every 10 ms, therefore one application thread sample occurs (more or less) every 10 ms. Responsive to a determination that a thread sample threshold is exceeded in step 310, process 300 samples the executing code to create periodic stack sample data (step 312). Process 300 uses a period for a new kind of sample called a stack sample that is expressed in some number of these existing thread samples referred to as a stack-sampling period. The stack sampling period value in the current example is thread-specific and can change over time. Initially, a stack-sampling period is set to 1 or 2 samples, for example. Responsive to a determination that a thread sample threshold is not exceeded in step 310, process 300 returns to step 308 sampling the executing code to create periodic thread sample data.

Multiple levels of samples are described in the previous examples using a Java virtual machine environment with a sampling mechanism, which produces application thread samples with a constant period (such as 10 ms). However, in environments in which there is no sampling mechanism, there will not be any application thread samples and only stack samples will be available. In such an environment, rather than count some predetermined number of application thread samples to trigger a stack sample as in step 310 (in the event 10 ms is not long enough to identify a single method), another calculation to compute a new stack sample period (previously expressed as a number of application thread samples) could be used to extend the stack sample period to an arbitrary length. For example, a new stack sample period need not be rounded to 10 ms as in the previous examples because the sample period easily converts to a number of application thread samples and can therefore be set to any period long enough to identify a single method. The stack sample period thus defined using a time basis, in an alternative embodiment, controls creation of stack sample data rather than a count of thread samples previously described.

Stack samples perform bookkeeping on values collected in thread→HSV and thread→RA_HSV. The bookkeeping operation requires several additional values stored on each thread in the form of a sample highest stack pointer value (thread→S_HSV), and a sample return address corresponding to a sample highest stack pointer value (thread→S_RA_HSV), and a number of times the sample highest stack pointer value has been seen (thread→S_COUNT_HSV). In addition, to track when stack samples should be performed, the values of stack sample period (thread→SSP) and a current application thread sample count since a last stack sample (thread→ATSAMPLE_COUNT) are also added to the thread structure.

When an application thread sample fires, (or new stack sample period where thread sampling is not present) the following extra pseudo-code snippet is inserted to perform a stack sample which updates values on a thread:

```
thread->ATSAMPLE_COUNT--;
if (thread->ATSAMPLE_COUNT == 0) {
    // time to do a stack sample
    if (thread->S_HSV == thread->HSV)  // if highest stack
    pointer value seen over the stack sample interval matches the best
    seen in earlier stack samples
        thread->S_COUNT_HSV++;
    else {
        thread->S_HSV = thread->HSV;
        thread->S_RA_HSV = thread->RA_HSV;
        thread->S_COUNT_HSV = 1;
    }
    // method stack sample code to be inserted here *** see next
    section
    thread->HSV = 0;
    thread->RA_HSV = 0;
    thread->ATSAMPLE_COUNT = thread->SSP; // wait for
    thread->SSP application thread samples before doing another stack
    sample
}
```

When a stack associated with a thread is grown, the thread→S_HSV and thread→HSV values must have (new thread stack base−old thread stack base) added to them. Process 300 determines whether a stack sample threshold is exceeded (step 314). Responsive to a determination that a stack sample threshold is exceeded in step 314, process 300 creates periodic method stack sample data (step 316). A method stack sample is expressed in a predefined number of existing stack samples to define a method stack sampling period in the current example.

After a predetermined number of stack samples, a method stack sample is performed. Responsive to a determination that a stack sample threshold is not exceeded in step 314, process 300 returns to step 312 to create periodic stack sample data as before.

For example, any number of stack samples could be used, but in one example 10 stack samples are used. In one illustrative embodiment, similarly to how application thread samples are counted to determine when a stack sample occurs, stack samples are counted to determine when a method stack sample occurs using one more values on a thread representing the current stack sample count since a last method sample (thread→METHOD_SAMPLE_COUNT).

Process 300 determines whether a root method is identified (step 318). Having created method stack sample data in step 316, the method stack sample data is used to determine whether a root method is identified (step 318). Responsive to a determination that a root method is identified, process 300 reports a root method for the threads (step 320) and terminates thereafter (step 324). Reporting may be in the form of a string values representing a method, a pointer to a method or other suitable indication to a caller or requester or user, wherein a user may also be another code portion and is not intended to limit a result to specifically provide a report to a human user.

For example, when all 10 stack samples discovered a same thread→S_HSV value (indicated by thread→S_COUNT_HSV==10) then a root method is identified (indicated by the return address stored in thread→S_RA_HSV). Responsive to a determination that a root method is not identified, process 300 extends a stack sample period (step 326) and returns thereafter to step 312. A threshold value less than 10 may be used, but anything lower than ten indicates either a mismatch between the stack-sampling period used and a length of the operation being performed by the root method, or behavior of the application has changed after some number of samples. In either case, extending the period of stack samples should improve chances of obtaining 10 consistent stack samples. Although many simple ways can determine a length of an extension of the period required, the count value obtained provides a hint regarding a length of an extension of the period required. For example, the sample may be grown by a factor 10/thread→S_COUNT_HSV, and by at least one sample using the following code snippet:

```
float factor = 10.0 / (float) thread->S_COUNT_HSV;
int new_SSP = thread->SSP * factor;
if (new_SSP == thread->SSP)
    thread->SSP++;
```

The following pseudo code snippet is inserted at the *** location identified in the stack sample code shown previously:

```
thread->METHOD_SAMPLE_COUNT--;
if (thread->METHOD_SAMPLE_COUNT == 0) {
    // time to do a method stack sample
```

```
        if (thread->S_COUNT_HSV == 10) {
        // found a root method on this thread , look up return address
      in thread->S_RA_HSV to see what method it is
        }
        else {
        // need to extend stack sampling period to find the real root
      method
            float factor = 10.0 / (float) thread->S_COUNT_HSV;
            int new_SSP = thread->SSP * factor;
            if (new_SSP == thread->SSP)
              thread->SSP++;
        }
        thread->S_HSV = 0;
        thread->S_RA_HSV = 0;
        thread->S_METHOD_COUNT = 0;
        thread->METHOD_SAMPLE_COUNT = 10; // wait for 10
      stack samples before doing another method stack sample
        }
```

For convenience, the following code snippet provides an example of instrumentation required in an application thread sample handler:

```
    thread->ATSAMPLE_COUNT--;
    if (thread->ATSAMPLE_COUNT = 0) {
    // time to do a stack sample
      if (thread->S_HSV == thread->HSV)   // if highest stack
    pointer value seen over the stack sample interval matches the best
    seen in earlier stack samples
          thread->S_COUNT_HSV++;
      else {
        thread->S_HSV = thread->HSV;
        thread->S_RA_HSV = thread->RA_HSV;
        thread->S_COUNT_HSV = 1;
      }
      thread->METHOD_SAMPLE_COUNT--;
      if (thread->METHOD_SAMPLE_COUNT == 0) {
        // time to do a method stack sample
        if (thread->S_COUNT_HSV == 10) {
        // found a root method on this thread, look up return
    address in thread->S_RA_HSV to see what method it is
        }
        else {
        // need to extend stack sampling period to find the real root
      method
            float factor = 10.0 / (float) thread->S_COUNT_HSV;
            int new_SSP = thread->SSP * factor;
            if (new_SSP == thread->SSP)
              thread->SSP++;
        }
        thread->S_HSV = 0;
        thread->S_RA_HSV = 0;
        thread->S_METHOD_COUNT = 0;
        thread->METHOD_SAMPLE_COUNT = 10; // wait for 10
      stack samples before doing another method stack sample
      }
      thread->HSV = 0;
      thread->RA_HSV = 0;
      thread->ATSAMPLE_COUNT = thread->SSP; // wait for thread-
    >SSP application thread samples before doing another stack
    sample
    }
```

Figure 4:
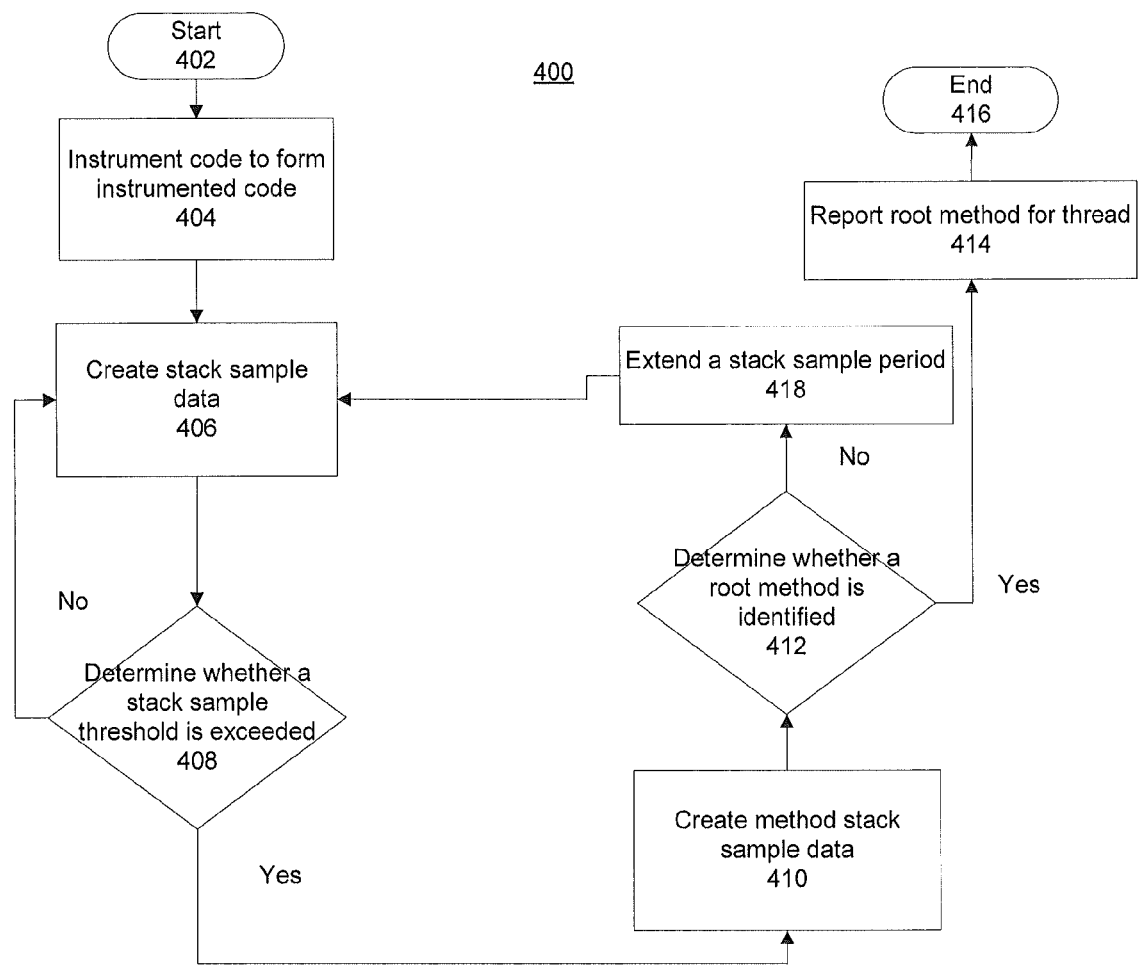
FIG. 4 is a flowchart illustration of an alternative embodiment of an identification process using the identification system of FIG. 2 in accordance with one embodiment of the disclosure.

With reference to FIG. 4, a flowchart of an alternative embodiment of an identification process using the identification system of FIG. 2 in accordance with one embodiment of the disclosure is presented. Process 400 represents an alternative embodiment of the identification process of FIG. 3, in which application thread sampling is known to be absent. Process 400 is an example of an embodiment of the identification process in which thread sampling is not performed and therefore no determination is made regarding whether thread sampling exists.

Process 400 begins (step 402) and instruments code to form instrumented code (step 404). Code instrumentation is performed by an enhanced compiler, such as enhanced compiler 202 of FIG. 2, through addition of values used in tracking values associated with stack activity to form an enhanced thread data structure.

Process 400 samples the executing code to create periodic stack sample data (step 406). A stack sample is expressed as a value representing one of a predefined number of processor cycles count based stack-sampling period and a time based stack-sampling period. A stack-sampling period value is thread-specific and can change over time. In this embodiment, creation of periodic stack sample data does not rely on a thread sample count, rather the trigger may be expressed as a time driven event or a processor cycle driven event. Other simple triggers may be used as well.

Process 400 determines whether a stack sample threshold is exceeded (step 408). Responsive to a determination that a stack sample threshold is exceeded in step 408, process 400 creates periodic method stack sample data (step 410). A method stack sample is expressed in a predefined number of existing stack samples to define a method stack sampling period in the current example.

After a predetermined number of stack samples, a method stack sample is performed. Responsive to a determination that a stack sample threshold is not exceeded in step 408, process 400 returns to step 406 to create periodic stack sample data as before. For example, any number of stack samples could be used, but in one example 10 stack samples are used. In one illustrative embodiment, similarly to how application thread samples are counted to determine when a stack sample occurs, stack samples are counted to determine when a method stack sample occurs using one more values on a thread representing the current stack sample count since a last method sample (thread→METHOD_SAMPLE_COUNT).

Process 400 determines whether a root method is identified (step 412). Having created method stack sample data in step 410, the method stack sample data is used to determine whether a root method is identified (step 412). Responsive to a determination that a root method is identified, process 400 reports a root method for the threads (step 414) and terminates thereafter (step 416). Responsive to a determination that a root method is not identified, process 400 extends a stack sample period (step 418) and returns thereafter to step 406. The stack sample period may be adjusted as previously described in process 300 of FIG. 3.

In one embodiment, a computer-implemented process for identification of a root method is provided. The computer-implemented process comprises instrumenting code to form instrumented code and creating stack sample data. It also comprise creating method stack sample data in a case that the stack sample data exceeds a stack sample data threshold, determining whether a root method is identified using the method stack sample data; and reporting any root method identified for a respective thread. Thread sample data is created in a case that thread samples are provided. It is also provided in a case that thread samples are not provided and in a case that said thread samples exceed a thread sample threshold. In addition, the time period is extended until the stack sample data exceeds the stack sample data threshold.

Instrumenting code to form instrumented code further comprises adding code using a technique selected from a set of techniques including in a presence of more than one stack, tracking HSV values for each stack independently, wherein the more than one stack is a set of stacks including an interpreted stack and a native stack; using binary instrumentation; adding code to the enhanced runtime that walks frames on a stack to determine where a thrown exception should be handled; and updating an HSV stack pointer value stored on a thread by adding a value of (new thread stack base−old thread stack base).

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

In the course of the description one or more illustrative implementation of one or more embodiments were provided. However, the disclosed systems and/or methods may be implemented using any number of techniques as known to those skilled in the art and these description were provided only for ease of clarity with an understanding that their disclosure should in no way be limited to the illustrative implementations, drawings, and techniques illustrated, including the exemplary designs and implementations illustrated and described herein, but may be modified within the scope of the appended claims along with their full scope of equivalents.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIG. s illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIG. s. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented process for identification of a root method for a thread, the computer-implemented process comprising:
   instrumenting code to form instrumented code;
   executing threads of the instrumented code;
   creating stack sample data that summarizes stack usage across a plurality of threads;
   creating method stack sample data that summarizes stack usage across a plurality of the stack sample data, the creating method stack sample data is in response to determining that more than a threshold number of stack sample data have been created, the method stack sample data including a number of times that a highest stack pointer value is contained in the stack sample data;

determining whether a root method is identified, the determining comprising comparing the number of time that the highest stack pointer value is contained in the stack sample data to a threshold value;

reporting any root method identified for a respective thread; and creating thread sample data as input to the creating stack sample data in a case that thread samples are provided, wherein the creating stack sample data is performed in a case that thread samples are not provided and in a case that a number of the thread samples exceeds a thread sample threshold number.

2. The computer-implemented process of method 1, further comprising extending a time period until more than the threshold number of stack sample data have been created.

3. The computer-implemented process of claim 1, wherein instrumenting code to form instrumented code further comprises:

augmenting a thread data structure to contain tracking elements including a highest stack value (thread→HSV);

a return address corresponding to highest stack value (thread→RA_HSV), a sample highest stack pointer value (thread→S_HSV);

a sample return address corresponding to sample highest stack pointer value (thread→S_RA_HSV);

a number of times the sample highest stack pointer value has been seen (thread→S_COUNT_HSV), stack sample period (thread→SSP);

a current application thread sample count since a last stack sample (thread→ATSAMPLE_COUNT) and a current stack sample count since the last method sample (thread→METHOD_SAMPLE_COUNT); and adding code using a selected technique from a set of techniques including in a presence of more than one stack, tracking HSV values for each stack independently, wherein the more than one stack is a set of stacks including an interpreted stack and a native stack; using binary instrumentation; adding code to the enhanced runtime that walks frames on a stack to determine where a thrown exception should be handled; and updating an HSV stack pointer value stored on a thread by adding a value of (new thread stack base-old thread stack base).

4. The computer-implemented process of claim 1, wherein the stack sample data is expressed as a value representing one of a predefined number of existing thread samples to define a stack-sampling period, a processor cycle count based stack-sampling period and a time based stack-sampling period; and wherein a stack-sampling period value is thread-specific and can change over time.

5. The computer-implemented process of claim 1, wherein the method stack sample is expressed in a predefined number of existing stack samples to define a method stack-sampling period using values on a thread representing a current stack sample count since a last method sample.

6. The computer-implemented process of claim 1, wherein determining whether the root method is identified further comprises: determining whether a predefined number of samples in the method stack sample data indicates a same method.

7. A computer program product for identification of a root method for a thread, the computer program product comprising a non-transitory computer readable storage medium having computer readable program code embodied therewith, said computer readable program code being executable by a processor to:

instrument code to form instrumented code;

execute threads of the instrumented code;

create stack sample data that summarizes stack usage across a plurality of threads;

create method stack sample data that summarizes stack usage across a plurality of the stack sample data, the creating method stack sample data is in response to determining that more than a threshold number of stack sample data have been created, the method stack sample data including a number of times that a highest stack pointer value is contained in the stack sample data;

determine whether a root method is identified, the determining comprising comparing the number of time that the highest stack pointer value is contained in the stack sample data to a threshold value;

report any root method identified for a respective thread; and create thread sample data as input to the creating stack sample data in a case that thread samples are provided, wherein the creating stack sample data is performed in a case that thread samples are not provided and in a case that a number of the thread samples exceeds a thread sample threshold number.

8. The computer program product of claim 7, further comprising extending a time period until more than the threshold number of stack sample data have been created.

9. The computer program product of claim 7, wherein instrumenting code to form instrumented code further comprises:

augmenting a thread data structure to contain tracking elements including a highest stack value (thread→HSV), a return address corresponding to highest stack value (thread→RA_HSV), a sample highest stack pointer value (thread→S_HSV), a sample return address corresponding to sample highest stack pointer value (thread→S_RA_HSV), a number of times the sample highest stack pointer value has been seen (thread→S_COUNT_HSV), stack sample period (thread→SSP), a current application thread sample count since a last stack sample (thread→ATSAMPLE_COUNT) and a current stack sample count since the last method sample (thread→METHOD_SAMPLE_COUNT));

adding code using a selected technique from a set of techniques including in a presence of more than one stack, tracking HSV values for each stack independently, wherein the more than one stack is a set of stacks including an interpreted stack and a native stack and using binary instrumentation;

adding code to the enhanced runtime that walks frames on a stack to determine where a thrown exception should be handled; and updating an HSV stack pointer value stored on a thread by adding a value of (new thread stack base-old thread stack base).

10. The computer program product of claim 7, wherein the stack sample is expressed as a value representing one of a predefined number of existing thread samples to define a stack-sampling period, a processor cycle count based stack-sampling period and a time based stack-sampling period; and wherein a stack-sampling period value is thread-specific and can change over time.

11. The computer program product of claim 7, wherein the method stack sample is expressed in a predefined number of existing stack samples to define a method stack-sampling period using values on a thread representing a current stack sample count since a last method sample.

12. The computer program product of claim 7, wherein computer executable program code for determining whether the root method is identified further comprises determining whether a predefined number of samples in the method stack sample data indicates a same method.

13. An apparatus for identification of a root method of a thread, the apparatus comprising:
- a communications fabric;
- a memory connected to the communications fabric, wherein the memory contains computer executable program code;
- a communications unit connected to the communications fabric;
- an input/output unit connected to the communications fabric;
- a display connected to the communications fabric; and
- a processor unit connected to the communications fabric, wherein the processor unit is configured to execute the computer executable program code to:
  - instrument code to form instrumented code;
  - execute threads of the instrumented code;
  - create stack sample data that summarizes stack usage across a plurality of threads;
  - create method stack sample data that summarizes stack usage across a plurality of the stack sample data, the creating method stack sample data is in response to determining that more than a threshold number of stack sample data have been created, the method stack sample data including a number of times that a highest stack pointer value is contained in the stack sample data;
- determine whether a root method is identified, the determining comprising comparing the number of time that the highest stack pointer value is contained in the stack sample data to a threshold value;
- report any root method identified for a respective thread; and
- create thread sample data as input to the creating stack sample data in a case that thread samples are provided, wherein the creating stack sample data is performed in a case that thread samples are not provided and in a case that a number of the thread samples exceeds a thread sample threshold number.

14. The apparatus of claim 13, wherein instrumenting code to form instrumented code further comprises program code to:
- augment a thread data structure to contain tracking elements including a highest stack value (thread→HSV), a return address corresponding to highest stack value (thread→RA_HSV), a sample highest stack pointer value (thread→S_HSV), a sample return address corresponding to sample highest stack pointer value (thread→S_RA_HSV), a number of times the sample highest stack pointer value has been seen (thread→S_COUNT_HSV), stack sample period (thread→SSP), a current application thread sample count since a last stack sample (thread→ATSAMPLE_COUNT) and a current stack sample count since the last method sample (thread→METHOD_SAMPLE_COUNT));
- add code using a selected technique from a set of techniques including in a presence of more than one stack, tracking HSV values for each stack independently, wherein the more than one stack is a set of stacks including an interpreted stack and a native stack using binary instrumentation;
- add code to the enhanced runtime that walks frames on a stack to determine where a thrown exception should be handled; and
- update an HSV stack pointer value stored on a thread by adding a value of (new thread stack base−old thread stack base).

15. The apparatus of claim 13, wherein the stack sample data is expressed as a value representing one of a predefined number of existing thread samples to define a stack-sampling period, a processor cycle count based stack-sampling period and a time based stack-sampling period and wherein a stack-sampling period value is thread-specific and can change over time.

* * * * *